United States Patent Office 2,748,378
Patented May 29, 1956

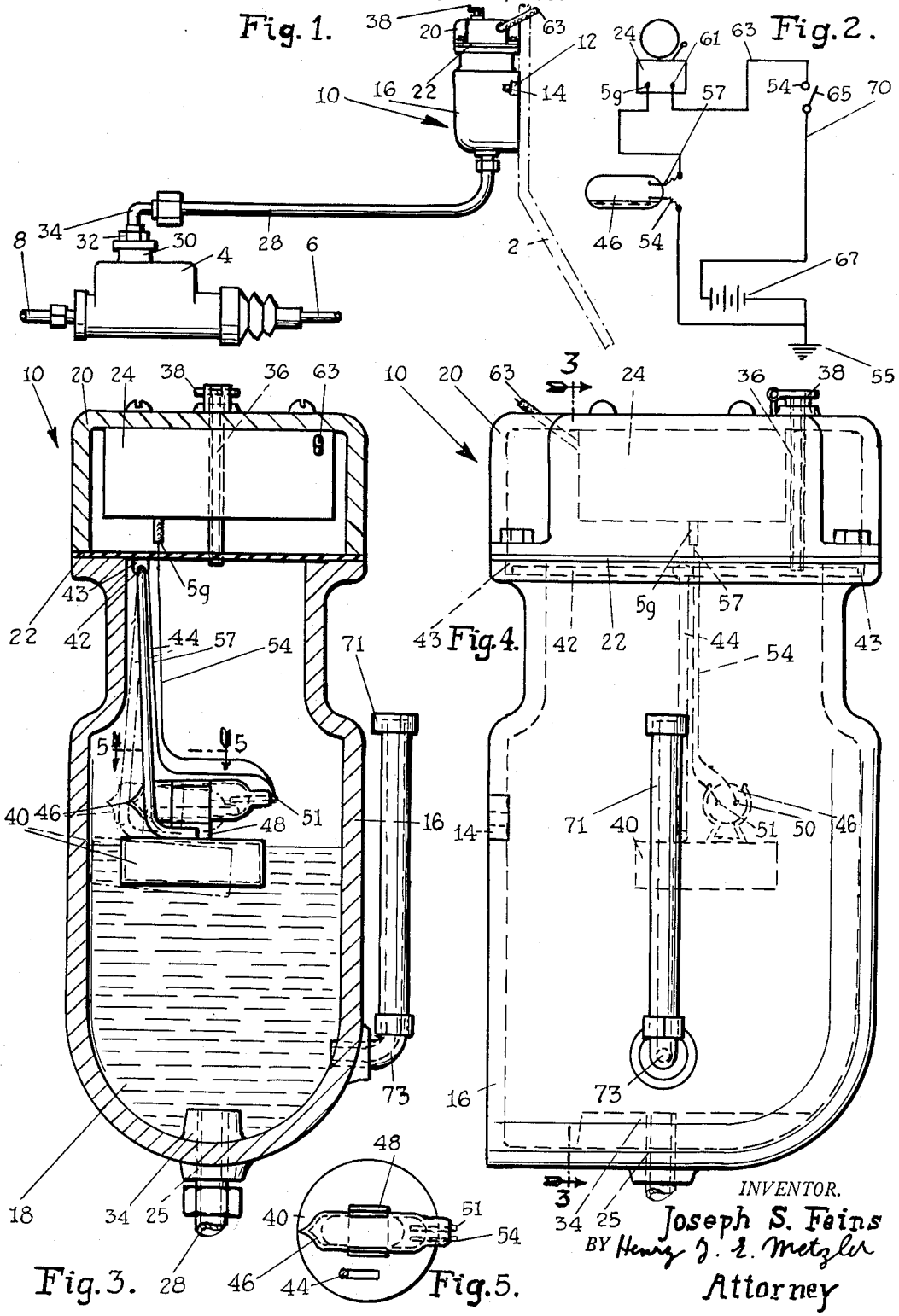
May 29, 1956     J. S. FEINS     2,748,378
BRAKE FLUID LEAK DETECTORS
Filed Feb. 12, 1953
INVENTOR.
Joseph S. Feins
BY Henry J. E. Metzler
Attorney

2,748,378

BRAKE FLUID LEAK DETECTORS

Joseph S. Feins, New York, N. Y.

Application February 12, 1953, Serial No. 336,495

1 Claim. (Cl. 340—244)

This invention relates generally to hydraulically operated braking systems of the type employed on vehicles.

In hydraulically operated braking systems now in general use, there is provided a master cylinder adapted to contain a supply of a special brake fluid through the medium of which the brakes of the vehicle are operated. Loss of fluid from the master cylinder occurs from several causes with the attendant failure of the braking system and a possible serious accident from loss of control of the vehicle. Loss of brake fluid can result from a small leak in one of the flexible hoses leading to each wheel, or from any part of the copper line, from any brass fitting, from the seals or rubber cups in each wheel cylinder or from the master cylinder. Since the hydraulic system depends on brake fluid which is chiefly made of a light viscous fluid of alcohol and glycerine, this light fluid seeps past the seals, the leak is usually infinitesimal and unnoticed until it is completely depleted. The action of the pistons in each cylinder, some two to a wheel, and the master cylinder pushing the rubber cups in and out causes a slight loss of fluid to pass the cups. If a drop is lost in each application of the brake pedal and 8 cylinders lose a bit in a short time the contents of the master cylinder is depleted to a dangerous level. This grave danger is even greater when a line breaks or a wheel cylinder pops out. The average master cylinder contains about 4 or 5 fluid ounces, and a few slight losses will mount up to completely emptying the master cylinder.

I am aware that various devices have been proposed for avoiding the ever-present danger of brake fluid losses to drivers and occupants of omnibuses, pleasure cars, trucks, tractors, and other vehicles using hydraulic brakes or depending upon hydraulic operation of vital parts, such as hydraulically actuated landing gears of aircraft and the like. However, the present invention offers distinct advantages over similar devices hitherto known.

An object of this invention is to provide a device which, in its association with the master cylinder of a hydraulically operated braking system, functions automatically to warn the operator when the level of the brake fluid has been lowered to a predetermined safe level as a result of loss of fluid, so that the necessary replenishment of fluid can be made before the lack of fluid causes failure of the braking system.

Another object of the present invention is the provision of a device of the character described which can be installed easily and quickly, not only in newly manufactured vehicles, but also in already existing vehicles without any structural alterations of the master cylinder or of any other part of the brake system, and the installation does not require a skilled mechanic but can be carried out by the operator himself. The device can be connected to the brake system simply by removing therefrom the ordinary filling plug and substituting therefor a plug connected to the device, and making a simple wire connection from the device to any suitable part of the electric wiring system of the vehicle, preferably to the ignition lock switch.

A further object of the present invention is the provision of a device of the character described which is designed to operate perfectly irrespective of the position and/or inclination of the vehicle, so that its functioning will not be impaired by a vehicle driving up or down a steep hill or the like, and which also is so constructed that any impurities which may be in the brake fluid cannot pass from the device to the master cylinder or to any other parts of the braking system.

Yet a further object of the present invention is the provision of a device of the character described which greatly facilitates the filling in of brake fluid as well as the bleeding of the brakes, a practice used frequently by mechanics to expel air from the brake lines, necessitating removing the cap from the master cylinder, and filling it a few times; by using this device the fluid reservoir is large enough to require one filling only, thus saving time.

Another object of the present invention is the provision of a device of the character described which consists of only a few simple, inexpensive parts, that can be assembled quickly and easily, so that the device can be manufactured at low cost, but which is also durable, of a small size, light in weight, sturdy and well-adapted for withstanding the rough usage to which devices of this type frequently are subjected.

With the foregoing and other objects in view which will appear as the description proceeds, the invention consists of certain novel details of construction and combinations of parts hereinafter more fully described and pointed out in the claim, it being understood that changes may be made in the construction and arrangements of parts without departing from the spirit of the invention as claimed.

In the accompanying drawing a preferred form of the invention has been shown.

In said drawing:

Figure 1 is a side view of a preferred embodiment of my invention showing the same connected to a brake system and installed in a vehicle;

Fig. 2 is a wiring diagram;

Fig. 3 is an enlarged longitudinal sectional view on the line 3—3 of Fig. 4;

Fig. 4 is an enlarged side elevation; and

Fig. 5 is a sectional view on the line 5—5 of Fig. 3.

Similar reference characters refer to similar parts throughout the several views.

In the drawing the numeral 2 denotes a portion of the dashboard of a vehicle, which is equipped with a hydraulic braking system having a master cylinder 4 from which extends a brake piston rod 6 as well as a main brake line 8. The elements 2, 4, 6 and 8 form no part of my present invention.

My new and improved leak detector mechanism preferably is contained in a simple container 10, which can be attached to any suitable part of a vehicle, for instance to a portion of the dashboard 2, by means of a pair of screws 12 (Fig. 1) or the like extending through lug portions 14 of the container 10. The latter is to be mounted above the master cylinder 4, and its lower portion 16 is adapted for containing brake fluid 18 (Fig. 3). The hollow top portion 20 of the container 10, preferably is removably secured to the lower portion 16, and a plate 22 of any suitable, brake-fluid-resistant packing material is interposed between the portions 16 and 20. I prefer to utilize the space within the hollow top portion 20 for housing therein a buzzer 24, or any other suitable electrically operated alarm device. This arrangement allows the device to be made as one compact unit, but the alarm device can also be made as a separate unit to be located at a distance from the container 10 at a place where it will attract the attention of the operator of a vehicle. An outlet opening 25 in the lower end of the portion 16 is connected to a pipe 28. The brake cylinder 4 has the usual internally threaded filling opening in an outwardly flanged portion 30, to which an air vented plug (not shown) is normally applied. However, in the use of my invention the aforementioned plug is removed, and a plug 32 substituted therefor. An opening is vertically extended through the plug 32, and an angular pipe connection 34 is extended into said opening and secured to the plug 32. The connection 34 is connected to the pipe 28, which may be a copper tube, or the like. A section 34 of the bottom of the container portion 16 preferably is raised inwardly, and the outlet opening 25 is extended therethrough, so that the area surrounding the section 34 will act as a trap preventing impurities in the fluid 18 from passing through the pipe 28 from the container 1 to the master cylinder 4. A tube 36 perferably is extended from a fluid filler cap 38 at the outer side of the top portion 20 into the portion 16 for facilitating the filling of brake fluid into the container 10.

A float 40, which may be made as a hollow circular body as in the instance shown, or which may be of any other suitable shape and design, is tiltably mounted in the container 10 in such a manner that a change in the level of the liquid 18 will cause it to swing in a direction which is right-angularly disposed to the longitudinal axis of the vehicle to which the container 10 is attached. This arrangement will prevent a swinging of the float 40 when the vehicle is moving upwardly or downwardly on a steep grade. I prefer to carry out this feature of my invention in the manner shown in Figs. 3 and 4, where it will be seen that a rod 42 is rotatably mounted in a pair of grooves 43 in opposite upper edge sections of the narrow wall portions of the container portion 16, and a rod 44 has its upper end secured to the rod 42 and has mounted on its lower end the float 40. A mercury switch 46, or any other suitable switch, is secured to the float 40 by means of a bracket 48 or the like. The switch 46 has a pair of contacts 50 and 51. The contact 50 is connected by means of a thin, insulated flexible wire 54 or the like to the ground 55, while the contact 51 is connected by means of a thin, flexible wire 57 to one terminal 59 of the alarm 24. The other terminal 61 (Fig. 2) of the alarm 24 is connected by means of a wire 63 to a terminal 64 of the ignition lock switch 65, or to any other suitable part of the electrical system of the vehicle, and the switch 65 is connected to one terminal of the battery 67 by means of a wire 70. The other terminal of the battery 67 is grounded. While the fluid 18 is at its normal level, the parts 40, 44, 46 and 48 are in the position shown in full lines in Fig. 3, and in this position the electrical alarm current is interrupted. When the level of the liquid 18 is reduced, the parts 40, 44, 46 and 48 by means of gravity move in the position indicated by dash-and-dotted lines in Fig. 3, and the tilting of the switch 46 causes an electrical connection of the contacts 50 and 51, so that the alarm circuit is closed and the alarm 24 is actuated, warning the operator of the vehicle of a loss of brake fluid a considerable time prior to the pipe 28 and the master cylinder 4 becoming empty. In order to facilitate a checking of the level of the fluid 18 at all times, I prefer to attach a transparent gauge tube 71 to the outer side of the container portion 16, which is connected thereto by means of an angular pipe connection 73 extended into the lower portion 16 of the container 10.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having thus fully described my said invention, what I claim as new and desire to secure by Letters Patent is:

A self-contained brake fluid leak detector device for a vehicle having a hydraulic brake system which comprises a housing having a bottom container of conductive material adapted to be connected to and grounded upon a metal part of the vehicle and a cover plate removably secured to the bottom container to close the same, a partition wall dividing the housing into two compartments, one of said compartments adapted to contain brake fluid and provide a reservoir therefor, conduit means adapted to connect the housing and the fluid compartment to the vehicle brake system, the other compartment providing a dry space isolated from the reservoir compartment, an electrical alarm device mounted in said other compartment and having two electric terminals, a float suspended in said reservoir compartment and means for mounting the float upon the interior of the housing for pivotal movement about an axis running parallel to the longitudinal axis of the vehicle, a mercury switch mounted upon the float and having two terminals, one of said switch terminals grounded to said housing, a wire extending between the compartments and from the other of said switch terminals to one of the alarm device terminals, and an outlet wire extending out of the housing from the other terminal of the alarm device and adapted for attachment to an electric source upon the vehicle.

References Cited in the file of this patent
UNITED STATES PATENTS

| | | |
|---|---|---|
| 2,085,173 | Stansbury | June 29, 1937 |
| 2,127,422 | Phaneuf | Aug. 16, 1938 |
| 2,600,659 | Koch | June 17, 1952 |
| 2,613,293 | Marks | Oct. 7, 1952 |